United States Statutory Invention Registration [19]

[11] Reg. Number: H202

Geeter [43] Published: Feb. 3, 1987

[54] BARREL FLEXURE CONTROL SYSTEM

[75] Inventor: Eugene Geeter, Orange, N.J.

[73] Assignee: The United States of America as represented by the Secretary of the Army, Washington, D.C.

[21] Appl. No.: 870,214

[22] Filed: May 29, 1986

[51] Int. Cl.[4] ..... F41F 17/00; F41F 21/00

[52] U.S. Cl. ..... 89/14.05; 89/41.02; 89/41.16

[56] References Cited

U.S. PATENT DOCUMENTS 328,713 10/1885 Petty ..... 89/41.16

*Primary Examiner*—Stephen C. Bentley

*Attorney, Agent, or Firm*—Anthony T. Lane; Harold H. Card, Jr.; Michael C. Sachs

[57] ABSTRACT

An adapter is mounted on a gun barrel near its free end. The adapter contains spaced-apart fulcrums with an actuator between the fulcrums for bending or flexing the barrel with respect to the fulcrums. This bends the barrel, causing the muzzle of the barrel to move and thus re-air the barrel independently of a mount which carries the barrel. The adapter can be used in a rapid fire weapon. The flexing condition of the barrel at each round of a burst of fire is recorded and then used to supply forces to the barrel during a subsequent burst of fire. The applied forces compensate for the uncontrolled flexing of the barrel to increase accuracy.

9 Claims, 9 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

BARREL FLEXURE CONTROL SYSTEM

STATEMENT OF GOVERNMENT INTEREST

The invention described herein may be manufactured, used and licensed by or for the Government for Governmental purposes without the payment to be of any royalties thereon.

FIELD AND BACKGROUND OF THE INVENTION

The present invention relates in general to aiming systems for guns and in particular to a new and useful barrel adaptor technique or mechanism which is used to bend the barrel of a gun to increase accuracy and/or to aim the gun. The concept is based on a fixed gun, diverting the projectile while it is inside the gun barrel (or immediately after it has emerged). The present invention aims the muzzle of a fixed gun in lieu of the conventional method of aiming of the breach of the gun at the target.

A problem which was recognized many years ago by United States Army, was the fact that a gun is often unable to hit a target it is aiming at. To circumvent this problem, the Army developed high rate of fire weapons that were to be used in a "spray the area" concept. The concept was based on increasing the number of projectiles that reach the target area in the first few seconds, with the expectation that one of the projectiles at least would strike the target. The concept is often referred to as "firepower".

Although the concept increased hit probability at the target, high rate of fire weapons or firing in a burst fire mode still pose adverse aiming problems. In particular, within a burst of fire the second and subsequent rounds in a burst cannot be aimed or controlled by present day aiming systems for guns. Current aiming systems have the capability of aiming the first round in a burst of fire only (as in single shot firing) and thus provide low accuracy and high dispersion at the target.

Attempts have also been made to increase the accuracy of a weapon system which is used for single shot firing with the aid of sophisticated fire control systems and complex weapon stabilization platforms. A major limitation, however, in the system is the inability to hit a target that, due to enemy evasive maneuvering, cannot be aligned in front of a fixed aimed gun. The present invention proposes to satisfy this deficiency by providing pre-programmed flexures that produce pre-determined target impacts relative to the breach aim point for those type target encountered.

Nevertheless, weapons continue to be inaccurate, and this in turn leads to extremely high costs in terms of lives (in a combat situation), time and material.

One factor which contributes to the inaccuracy of the gun is the fact that the gun tube or barrel vibrated and the elastic behavior of the gun mount after a projectile has emerged from the muzzle of the barrel. To date the muzzle excursion of the gun barrel has not been completely defined. Nevertheless it has been recognized that the position of the muzzle at the time when a projectile emerges therefrom, is the principal factor influencing the impact location of the projectile at the target. The projectile dispersion at the target is, therefore, primarily a reflection of the elastic behavior of the gun mount and barrel, taking into account their excitation due to the firing impulse and projectile motion.

Thus the essence of the present invention concept is to force or drive the muzzle of the barrel into the correct spatial position prior to or at the time when a projectile emerges from the muzzle. The corrected muzzle position can be obtained within milliseconds.

SUMMARY OF THE INVENTION

A main object of the invention is to utilize a controlled flexure or bending of a gun barrel as a means of correcting, in the time between firings of projectiles, deviations imparted to the barrel or muzzle, to duplicate a first round target impact for high rate of fire bursts with a fixed aimed breach.

A further object of the invention is to utilize a controlled flexure or bending of a gun barrel as means of pre-aiming the muzzle for the second (2nd) and subsequent rounds in a high rate of first burst to obtain a pre-determined salvo shot pattern at the target with a fixed aimed breach.

A yet further object of the invention is to provide a controlled flexure of a gun barrel as an aiming mechanism with a fixed breach.

A still further object of the invention is to provide continuous controlled flexures of the barrel in consonance with but offsetting the gun mount motion such that stabilization of the muzzle aim point on the target will result irrespective of the varying gun mount motion.

The apparatus of the present invention includs means for bending the barrel in a controlled fashion. The invention also includes a method of increasing the accuracy and aiming of the gun using the bending of the barrel as a manipulative step.

According to the invention, a significant increase in accuracy of present day weapons can be achieved. Additional advantages of the invention are that the gun can be manipulated so that it has an increased time on target, increased survivability and less time to get on target. Still further benefits of the invention are that the gun can be manipulated to change or alter the center of gravity of the gun system and to provide centrifugal force.

The centrifugal force can be used to compensate for muzzle climb in guns (i.e. rifles and pistols) and to reduce recoil impulse in guns.

The controlled barrel flexure at high rates of fire also represents a substantial modification over present methods of mounting of mechanical sights on weapons. These new family of sights will correlate the aim point between an indepedent breach, an independent muzzle and the target. Further, the present invention can also lead to a new family of flexible gun barrels. Hydraulic power can be supplied externally for use in flexing or expanding gases generated by firing the projectile can be used for this purpose. In addition power for flexing the barrel can also be provided by a mechanical screw.

Accordingly a further object of the invention is to provide a gun barrel adaptor for a barrel having a longitudinal axis, which comprises bearing means engaged with the barrel at a selected location along its longitudinal axis, an actuating means engaged with the barrel at a location spaced from the bearing means for exerting a lateral force on the barrel to flex the barrel. The bearing means may comprise two separate bearings which are spaced apart on a longitudinal axis with the actuator disposed between the bearings. The barrel flex adaptor is solely supported by the barrel of the gun and its flexure motion is completely independent of the gun mount motion.

In practicing the method of the invention, a gun with a barrel that does not yet include the barrel adaptor can first be fired a plurality of times to produce a burst of fire. The uncontrolled flexing of the barrel can then be recorded for example by observing the dispersion pattern of the projectile at the target. From a pre-established calibration table, showing a predetermined range of single shot fixed flexures relative to initial breach aim point, a series of precision flex muzzle aim versus target impact corrections can be obtained. The barrel adaptor can then be programmed so that its actuator applies forces to counteract the empirically observed flexing of the barrel and thus increase accuracy.

In this way the round-to-round deviation pattern from the initial impact point of the first projectile can be corrected, based on pre-knowledge of how the gun barrel would flex if no external forces are applied to it. The two-dimensional dispersion pattern of the projectiles at the target can thus be corrected both vertically and horizontally.

The converse of this procedure will produce a predetermined salvo shot pattern at the target. In particular, the barrel adaptor can then be programmed so that its actuator first applies forces to counteract or correct the empirically observed error and then simultaneously add or substract to those forces with flexures in and accordance with the calibration table, which in turn will be dictated by the desired salvo target pattern.

A third way of practicing the method of the invention is to couple the gun mount motion directly to the barrel flex adapter. Such coupling can then provide the intelligence for the actuators to produce forces to counteract the gun mount motion. Thus, the initial static target aim point becomes a fixed reference point and any deviations in the muzzle position from this position is sensed as an error to be corrected or forced back to as quickly as possible.

The invention has been applied to an M139, 20 mm automatic cannon with firing rate at 1,000 shots per minute (the Oerilikon 20 mm Automatic Cannon). The target was positioned 1,000 inches from the muzzle of the gun barrel. The invention has also been applied to the M16 rifle with a firing rate of 800 shots per minute. The target was positioned 500 inches from the muzzle of the gun barrel.

A further object of the invention is to provide a barrel flexure adaptor which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings in which the invention is illustrated.

DESCRIPTION OF THE PREFERRED EMBODIMENTS

Figure 1:
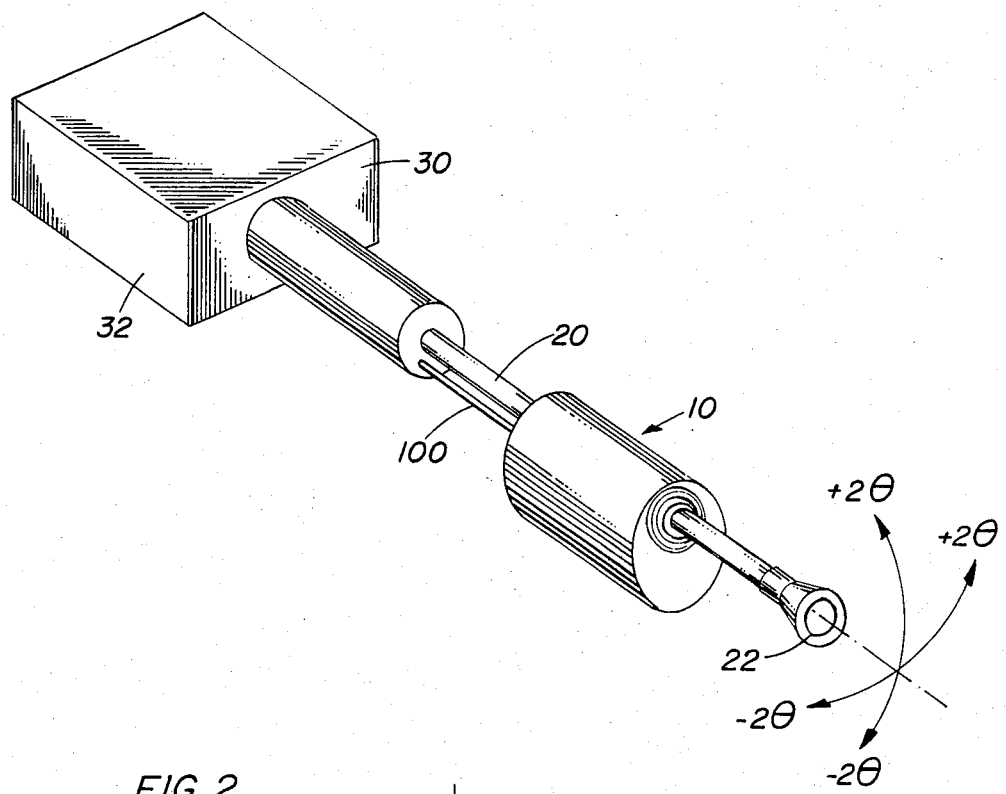
FIG. 1 is a perspective view of an automatic cannon carrying the barrel adaptor of the present invention.

Referring to the drawings in particular, the invention embodied in FIG. 1 comprises a barrel flexure control adaptor generally designated 10 that is mounted on the free end of a barrel 20 having a muzzle 22 from which projectiles are fired. Barrel 20 is connected to a known rapid fire weapon 30, such as the Oerilikon 20 mm automatic single barrel cannon, designated the M139. This weapon is capable of firing 1,000 shots per minute. Weapon 30 has a mounting 32 which can be mounted at a fixed location or on conventional aiming equipment for aiming barrel 20.

Actuators, to be described in greater detail later, are provided in adaptor 10 for flexing barrel 20 so that it can swing by selected angles $\pm 2\theta$, in both the vertical and the horizontal axes.

Figure 2:
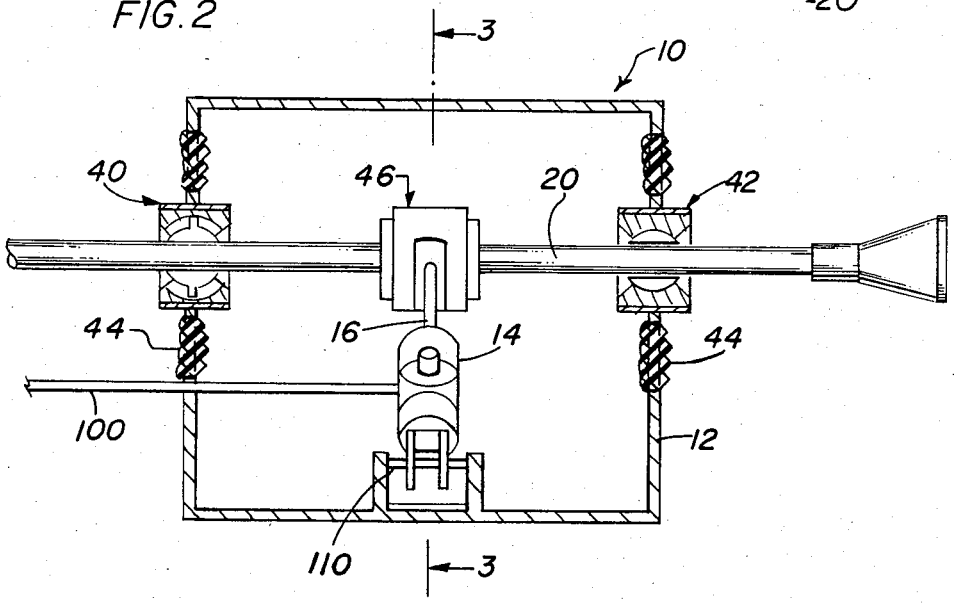
FIG. 2 is a sectional view partially in elevation showing the adaptor and its inner structure.
Figure 3:
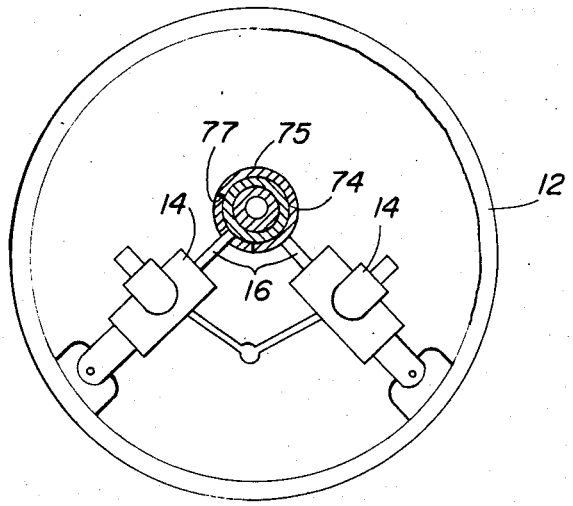
FIG. 3 is a sectional view, partly in elevation, taken along lines 3—3 of FIG. 2.

As shown in FIG. 2, adaptor 10 comprises a cylindrical enclosure 12 which defines an inner space containing two actuators 14, shown also in FIG. 3. Each of the actuators includes a hydraulic or pneumatic cylinder and piston with a piston rod 16 extending out of the cylinder. Piston rod 16 of actuators 14 are operatively connected at a central point in enclosure 12 to barrel 20.

Enclosure 12 also resiliently carries a first bearing 40 and a second bearing 42. Bearings 40 and 42 act as fulcrums about which barrel 20 pivots when a force is applied to the barrel by piston rod 16.

To permit relative movement between the barrel 20 and the enclosure 12, bellows or other semi-rigid support structures 44 are used to separate the bearings 40,42 from the enclosure 12.

It is noted that enclosure 12 may be replaced by any other support which holds the relative position between bearings 40 and 42 and the actuators 14. The support need not enclose the actuators.

Piston rods 16 are engaged with barrel 20 by a third bearing 46.

Figure 5:
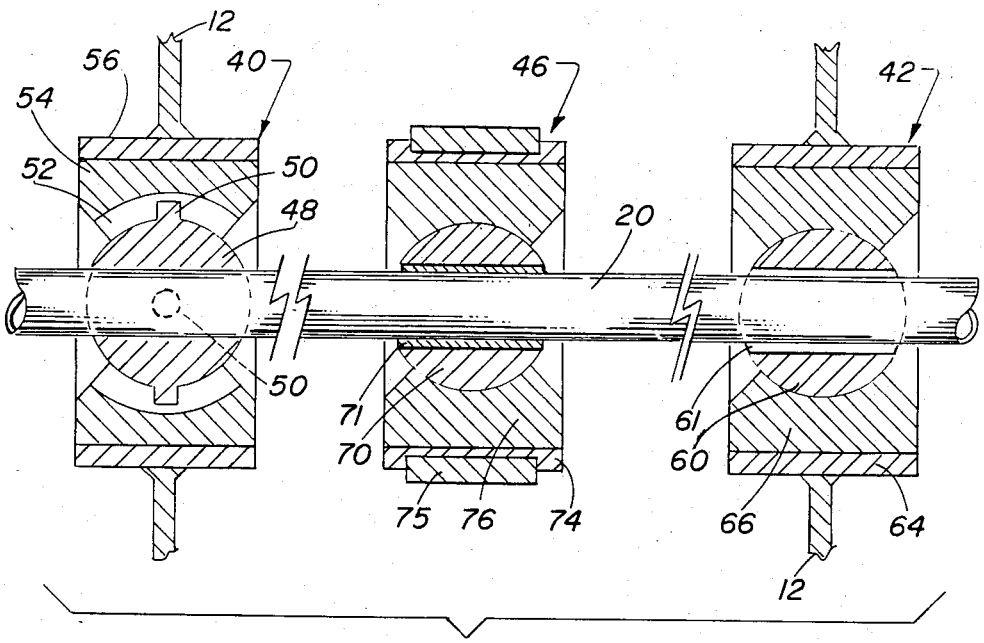
FIG. 5 is a fragmentary sectional view showing the bearing arrangement for the barrel in accordance with the present invention.

As shown in FIG. 5, bearing 14 includes an inner spherical member 48 which is fixed to barrel 20. Inner spherical member 48 includes four outwardly extending posts 50 (two of which are shown in FIG. 5 in solid line and one of which is shown in dotted line.) Posts 50 ride in slots 52 which are milled into outer spherical member 54. A support ring 56 carries outer spherical member 54 and mounted to the enclosure 12, or more correctly the bellows 44. Bearing 40 thus forms a fixed fulcrum for barrel 20 which permits pivoting of the barrel with respect to bearing 40 but which precludes rotation and longitudinal movement with respect to the barrel. Inner spherical member 48 rolls in outer spherical member 54 but does not slide or rotate with respect to the outer spherical member.

The second bearing 42 includes an inner spherical member 60 which carries an inner linear bearing 61 which may simply comprise a sliding sleeve made of low friction material. Inner spherical member 60 rides in an outer spherical member 66 which is supported by a support ring 64 connected to enclosure 12. Barrel 20 can thus rotate and axially slide with respect to bearing 42.

The third bearing 46 includes an inner spherical member 70 having a linear bearing 71 in contact with barrel 20. Bearing 71 is the same as bearing 61 and permits linear sliding movement between bearing 46 and barrel 20. Spherical member 70 rotates in an outer spherical member 66 which is connected to a first support ring 74. A second support ring 75 rides in an annular recess on the outer surface of ring 74. Rings 74, 75 can rotate with respect to each other and with respect to barrel 20. In the same manner, barrel 20 can rotate with respect to spherical member 60 and thus with respect to second bearing 42.

As shown in FIG. 3, one of the piston rods 16 is connected to the first ring 74 and the other piston rod 16 is connected to the second outer ring 75. To permit relative rotation between rings 74 and 75, ring 74 is provided with a slot 77 through which the piston rod 16 that is connected to inner ring 74 extends.

Figure 4:
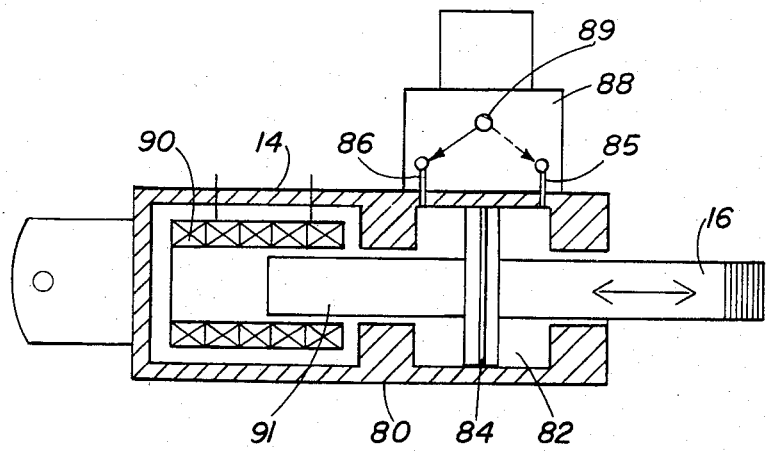
FIG. 4 is a sectional, partly schematic illustration, on an enlarged scale, showing one of the actuators for flexing the barrel.

FIG. 4 shows additional details of one of the actuators 14.

Actuator 14 includes a cylinder housing 80 which contains a cylinder space 82 which receives a piston 84 connected to piston rod 16. Hydraulic or pneumatic ports 85 and 86 are connected to opposite ends of cylinder 82 on opposite sides of piston 84, and to a fast-acting servo-valve 88 which is of known design. Servo-valve 88 receives pressure from a hydraulic or pneumatic pressure port 89 and can selectively supply that pressure to ports 85 or 86. Valve 88 can thus be actuated to either cause piston rod 16 to withdraw into cylinder 80 or to be pushed out of cylinder 80. This permits barrel 20 to be flexed both outwardly away from the actuators and inwardly toward the actuators.

A linear variable differential transformer 90 is also provided in cylinder 80 and interacts with an axial projection 91 of piston rod 16 to provide a signal which is indicative of the position of piston rod 16. A signal from transformer 90 can thus be used as an indication of the position of barrel 20 with respect to each actuator. In this way, with valve 88 in a neutral position supplying no pressurized fluid to cylinder space 82, transformer 90 can be used to sense the meandering position of the barrel 20 as a burst of projectiles is fired from the barrel.

Figure 6:
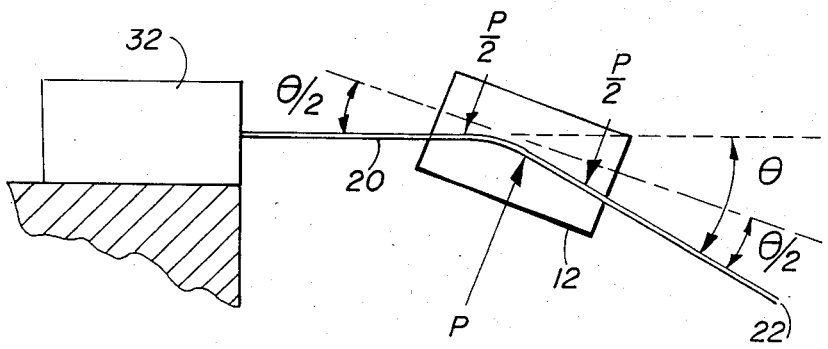
FIG. 6 is a schematic explanatory illustration showing the forces and flexing angles of the barrel.

FIG. 6 shows how a force P can be applied to the barrel between the fulcrum bearing which each absorbs a force P/2, to bend or flex the barrel. Each end of the barrel is flexed an anle $\theta/2$. In this way the muzzle of the barrel is flexed a total angle $\theta$ with respect to the base of the weapon which is held at a fixed location.

Figure 7:
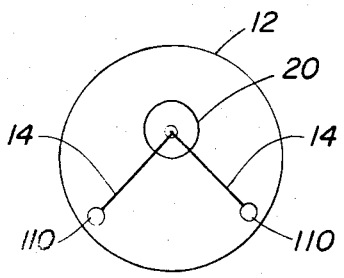
FIG. 7 is a schematic sectional view showing the position of the inventive adaptor and the barrel when it is not flexed.

By actuating the servo-valve 88 of each actuator 14, the barrel can be bent, within limits, to any desired orientation to move the muzzle around. FIG. 7 shows barrel 20 in a neutral position with neither actuator activated.

Figure 8:
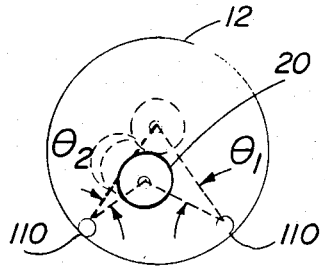
FIG. 8 is a view similar to FIG. 7 showing how the barrel can be flexed in two dimensions using two actuators according to the present invention.

FIG. 8 shows how with the actuator on the left actuated to a large extent and the actuator on the right actuated to a lesser extent, barrel 20 can be deflected so that the actuators form angles $\theta_1$ and $\theta_2$ with respect to their original or neutral positions.

Actuators 14 may be provided with pneumatic or hydraulic pressure over a pressure line 100. Pressure line 100 may be connected to an external source of pressure or may even be connected to an accumulator within the weapon 30 which is connected to the barrel for receiving and accumulating the pressure of expanding gasses produced by the projectiles themselves. Other pressure can be available from the recoil forces of barrel 20 when it is fired. In this way actuators 14 can be powered by the weapon itself and no external power supply is necessary.

Any other power supply can be used as actuators 14 for flexing the barrel 20.

It is also noted that each actuator 14 is pivotally mounted at a pivot connection 110 to the enclosure 12. This permits pivoting of the actuators with respect to the enclosure.

One mode of operation for the present invention is to first fire a burst of a selected number of projectiles from the barrel. In actual experiments that were conducted to verify the usefulness of the invention, five projectiles were fired in rapid succession. This produced a pattern at the target where the first projectile struck near the desired location on the target while the subsequent projectiles landed at increasing distances from that location. Due to uncontrolled flexing of the barrel 20, the other projectile also moved laterally. Each burst of fire roughly reproduced the same pattern. The pattern was recorded using transformer 90 and a casette tape was made of the recorded signals. These were fed back through an electrical control mechanism (not shown) to actuate the actuators 14 and thus counteract the flexing for each round in the burst. In this way the barrel was flexed to compensate for the uncontrolled bending and a more accurate pattern was achieved.

The present invention can also be used to aim the muzzle 22 of the barrel 20 by applying appropriate signals to the servo-valves 88 of the actuators.

Figure 9:
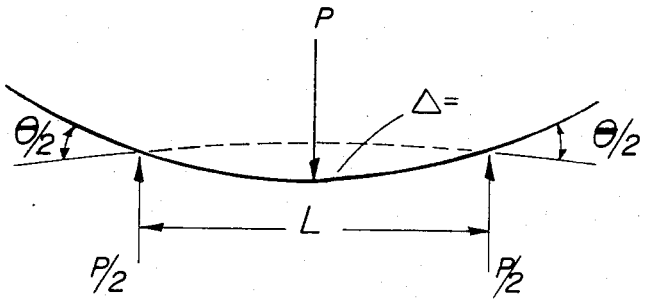
FIG. 9 is an explanatory illustration showing a flexed barrel.

Referring to FIG. 9, with length L between the fulcrums being chosen to be 23 inches, force P was applied by one actuator at the midpoint or at 11.5 inches from each fulcrum. The 20 mm barrel used had an inside diameter of 0.83 inches and an outside diameter of 1.57 inches. For a desired 0.5 inch deflection, $\Delta$, a force of 16.261 pounds was found necessary. The barrel is made of steel alloy $E=3\times10^7$. The force necessarily was calculated as a function of the moment of inertia for the barrel.

While specific embodiments of the invention have been shown and described in detail to illustrate the application of the principles of the invention, it will be understood that the invention may be embodied otherwise without departing from such principles.

What is claimed is:

1. A gun barrel adapter for a barrel having a longitudinal axis comprising:

a first bearing for engaging the barrel and for acting as a first fulcrum for flexing the barrel;

a second bearing for engaging the barrel at a location spaced along the longitudinal axis from the first bearing and for acting as a second fulcrum for flexing the barrel; and actuator means operatively connected to said first and second bearings and engaged to the barrel between said first and second bearings for applying a lateral force to the barrel for flexing the barrel whereby a position of a muzzle of the barrel can be changed.

2. An adapter according to claim 1, including a support connected to each of said first and second bearings and to each actuator, said actuator including a third bearing for engaging the barrel between said first and second bearings, said second and third bearings permitting relative rotation and sliding with respect to the barrel and said first bearing being fixed to the barrel for only permitting rotation of the barrel.

3. An adapter according to claim 2, including a second adapter extending at an angle to said first-mentioned adapter for flexing the barrel in a two-dimensional plane.

4. An adapter according to claim 1, including a support connected to said first and second bearings and to said actuator, said actuator comprising a cylinder defining a cylinder space connect to said support, a piston in said cylinder space and a piston rod extending from said cylinder space and operatively connected to the barrel between the first and second bearing, said actuator including a valve for applying pressure to said cylinder for moving said piston to flex said barrel.

5. An actuator according to claim 4, wherein said valve comprises a servo valve, and a linear sensor operatively connected to said piston rod for sensing the location of said piston rod.

6. A method of aiming a barrel comprising bending the barrel.

7. A method according to claim 6, including supporting the valve for rotation at at least one fulcrum and applying a lateral force to the barrel at a location spaced from the fulcrum to flex the barrel.

8. A method according to claim 7, including mounting the barrel at two spaced-apart fulcrums and applying the lateral force between said fulcrums.

9. A method according to claim 8, including prerecording uncontrolled flexing of the barrel at the location of the application of lateral force, during a burst of fire, and applying contrary lateral forces during a subsequent burst of fire.

* * * * *